United States Patent Office

3,359,359
Patented Dec. 19, 1967

3,359,359
TERMINAL BOX ARRANGEMENT WITH INTERNAL BARRIER SHIELDING
William Ernest Beck and George Robert Small, Edinburgh, Scotland, assignors to Bruce Peebles Industries Limited, Edinburgh, Scotland, a company of Great Britain
Continuation of application Ser. No. 242,969, Dec. 7, 1962. This application Jan. 31, 1967, Ser. No. 638,674
Claims priority, application Great Britain, Dec. 8, 1961, 44,114/61
5 Claims. (Cl. 174—51)

ABSTRACT OF THE DISCLOSURE

A terminal box arrangement characterized by internal barrier shielding comprising a box having front, rear and side wall portions; electrical connections extending from the box to an associated electrical machine; terminals on such connections, said terminals being supported on a portion of the box; conductors within the box which optionally may be connected to or disconnected from such terminals, said conductors extending thence to an electrical supply source for the machine; and, within the box, grounded metal-plate shielding separating adjacent terminals and adjacent conductors.

Related applications

Figure 1:
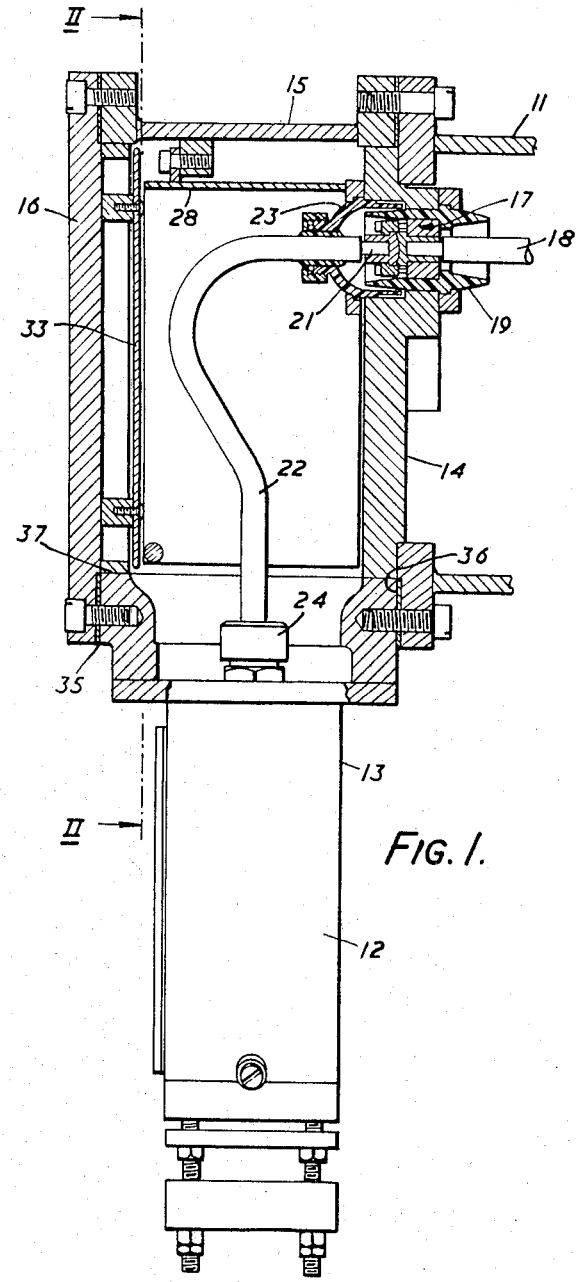

This application is a continuation of a prior United States application filed Dec. 7, 1962, for "Terminal Arrangement," as Ser. No. 242,969, now abandoned. As such it is entitled, for priority purposes, to the filing date of British application Ser. No. 44,114/61 of Dec. 8, 1961. The references cited in such prior United States application (Patents 1,610,903, 1,957,986 and 2,728,002) are representative of the prior art.

Background

This invention has to do with a terminal box with internal barrier shielding meeting the requirements for certain applications according to which only phase-to-earth arcing; i.e., phase-to-ground arcing, may occur within the terminal box.

Experience shows that a fault within a terminal box can occasion considerable damage and endanger personnel even in the short period of time that elapses prior to the operation of the protective equipment; moreover, in the case of a flameproof box, it is essential that no flames appear outside the box.

In general, a fault current of the phase-to-earth type can be held to a lower value than a fault current of the phase-to-phase type; accordingly, if phase-to-phase faults within the box are prevented, a smaller current only need be guarded against, whereby protection is made simpler.

Summary

According to the invention, a terminal box is provided incorporating, for example, connections leading to an electrical machine, terminals on such connections, conductors (leading, for example, to an electrical supply for the machine) which can be connected to, and disconnected from, the terminals, and one or more grounded metal plates positioned between adjacent conductors and between adjacent terminals preventing arcing from one of the such conductors to the other. Thus if a fault does occur, the arcing path will be short and the power of the arc correspondingly reduced.

Conveniently, the metal plate or plates form or assist in forming suitable compartments into each of which one of the terminals projects and along which the appropriate conductor extends. Such compartments can be defined partly by the walls and cover of a terminal box or entirely by metal plates, including removable metal partitions positioned between adjacent conductors. If an arc is struck to one of these metal plates, although the metal may melt it will prevent the arc from striking to the terminal box itself, so that this will not rupture and allow gas or flame to escape.

When the access cover is in position, the terminal box itself may be sealed to prevent water coming in; for the purpose, suitable sealing gaskets can be provided. If the arrangement is to be used in conjunction with certified flameproof equipment, there will also be the regulation gap between fitting parts. Preferably, the terminals are insulated without the use of insulation in tape or plastic form and may have their conductors connected to them merely by screwing up appropriate members.

Drawings

Figure 2:
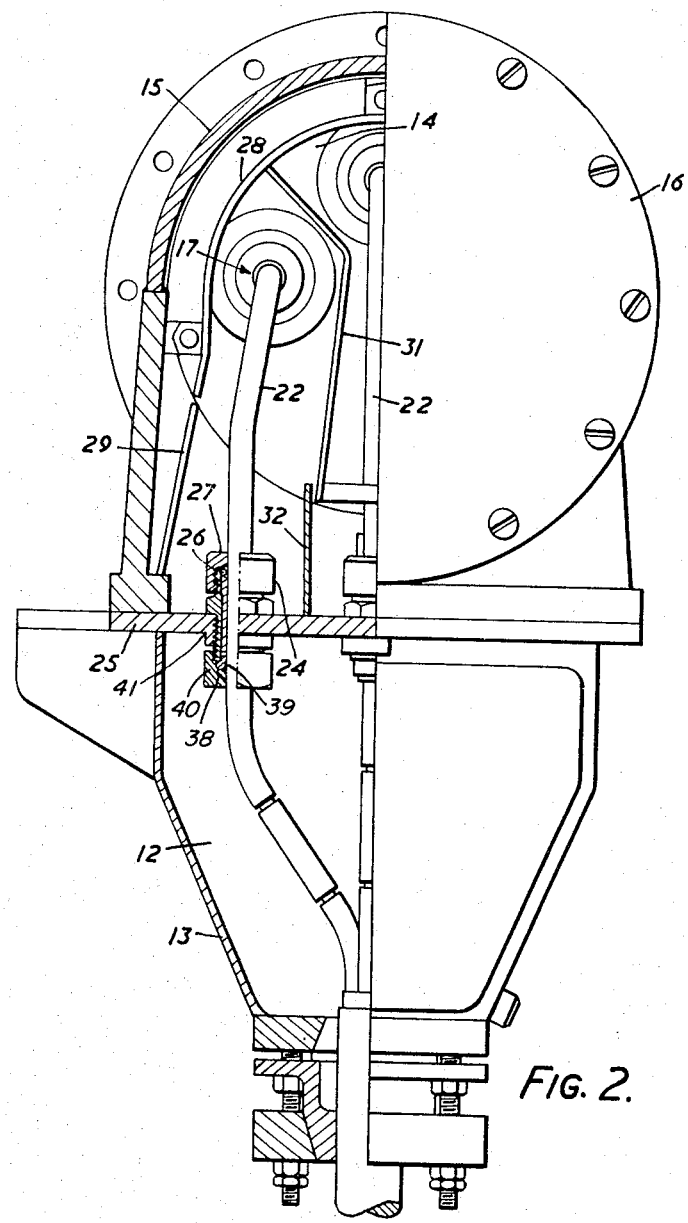

One embodiment of the invention will be described, by way of example, with reference to the accompanying drawings, in which:

FIGURE 1 is a section with parts in elevation taken on a central vertical plane passed through the front portion or cover and the rear portion or base, and FIGURE 2 is a front elevation, half in section, on line II—II in FIGURE 1.

Preferred embodiment

The terminal box illustrated in the drawings is for enabling the three terminals of a 3-phase A.C. electrical machine, part of which is shown at 11, to be connected to and disconnected from a power supply. The conductors 22 enter the terminal after first passing through a body of suitable insulating compound (not shown) contained in a sealing chamber 12 provided by a casing 13. The terminal box has a rear portion or base 14, side wall portions 15, and a removable front portion or access cover 16. The terminals themselves, shown generally at 17, are described in United States Patent 3,187,292.

The connections 18 from the machine 11 extend into an insulating bushing 19. The ends 21 of the corresponding conductors 22 enter the other end of the bushing. They are interconnected by appropriate mechanical assembly of components of the terminal. Water-sealing caps 23 are sealed to base 14 and around the ends of the conductors 22. The exposed parts are insulated without the use of insulation in tape form or in the form of a plastic compound.

Conductors 22 leave chamber 12 in casing 13 through insulating sealing glands 24 sealed in a grounded top plate 25 on casing 13. Each gland 24 contains a sealing ring 26 secured in place by a screw-on insulating cap 27. Below plate 25 each conductor carries a neoprene sealing ring 38 gripped between a steel sleeve 39 on the conductor and a steel nut 40 screwed on a threaded collar 41 that is itself screwed into and through the plate to abut against sleeve 39.

Each conductor 22 extends along a compartment defined in part by base wall 14 of the terminal box and in part by two or more removable metal plates forming grounded flash barriers. A plate 28 of roughly semi-cylindrical form is bolted to lugs carried by the walls 15 and abuts the base wall 14. It extends around all three terminals 17. Its free ends are closely spaced from the ends of a pair of plates 29 abutting against the plate 25 and welded to the terminal box. Each plate 29 intervenes between one of the outer conductors 22 and the outer wall of the terminal box, as can be seen in FIGURE 2.

Two further plates 31 welded at their outer ends to the semi-cylindrical plate 28 form partitions between the central terminal and each of the outer terminals. They extend as shown in FIGURE 2 into proximity to two transversely extending plates 32 welded to the terminal box and butting up against plate 25. In this way, three compartments can extend side by side generally parallel with each other and perpendicular to the plate 25. All three are closed by a metal plate 33 secured to access cover 16.

If the terminal box is used in conjunction with certified flameproof equipment, the gap between the mating surfaces of inwardly directed flange 37 on cover 16 and the corresponding parts of walls 15 should not be greater than the regulation maximum, which depends upon the gas present in the atmosphere in which the equipment is to operate. Preferably, the terminal box is sealed by means of a first sealing ring 35 between cover 16 and the side walls 15 and a second sealing ring 36 between the side walls and base 14.

It will be seen that those parts of each conductor and its terminal that are disposed within the terminal box are separated from their counterparts by grounded metal plates. Consequently, there is no leakage path from one conductor to another which does not first impinge on a grounded metal part. Thus if arcing occurs as a result of a fault within the terminal box, it will not be from one conductor to another.

Plates 28 and 33, which partly define the conductor compartments, also prevent arcing through to walls 15 or cover 16 of the terminal box. Arcing, when it occurs, tends to burn a hole in the member which it strikes. Although plates 28 and 33 may be ruptured as a result of arcing, they will keep the arc from striking through to and rupturing the wall of the box to allow the escape of gas and flame.

Claims

It is intended that all of the various features of patentable novelty residing in the invention shall be summarized in the appended claims, viz.

We claim:
1. A terminal box arrangement characterized by internal barrier shielding comprising a box having front, rear and side wall portions; electrical connections extending from the box to an associated electrical machine; terminals on such connections, said terminals being supported on a portion of the box; conductors within the box which optionally may be connected to or disconnected from such terminals, said conductors extending thence to an electrical supply source for the machine; and, within the box, grounded metal-plate shielding separating adjacent terminals and adjacent conductors, said metal-plate shielding defining a plurality of separate compartments (a) into each of which one of the terminals projects, (b) within each of which one of the conductors extends to an exit, and (c) wherein, in the stretches between the terminals and the exits, the compartments are co-extensive with the conductors.

2. A terminal box arrangement according to claim 1 wherein said metal-plate shielding is removable.

3. A terminal box arrangement according to claim 1 wherein said metal-plate shielding intervenes between the conductors and the terminal box itself.

4. A terminal box arrangement according to claim 1 wherein said metal-plate shielding forms the side walls of the compartments.

5. A terminal box arrangement according to claim 1 wherein, in the stretches between the terminals and the exits for the conductors, the compartments are in juxtaposed relationship to each other.

No references cited.

LARAMIE E. ASKIN, *Primary Examiner.*